Dec. 18, 1956  A. E. NESSLER ET AL  2,774,140
TRAVELING ROTARY VAT STRAINER
Filed Oct. 12, 1954  5 Sheets-Sheet 1
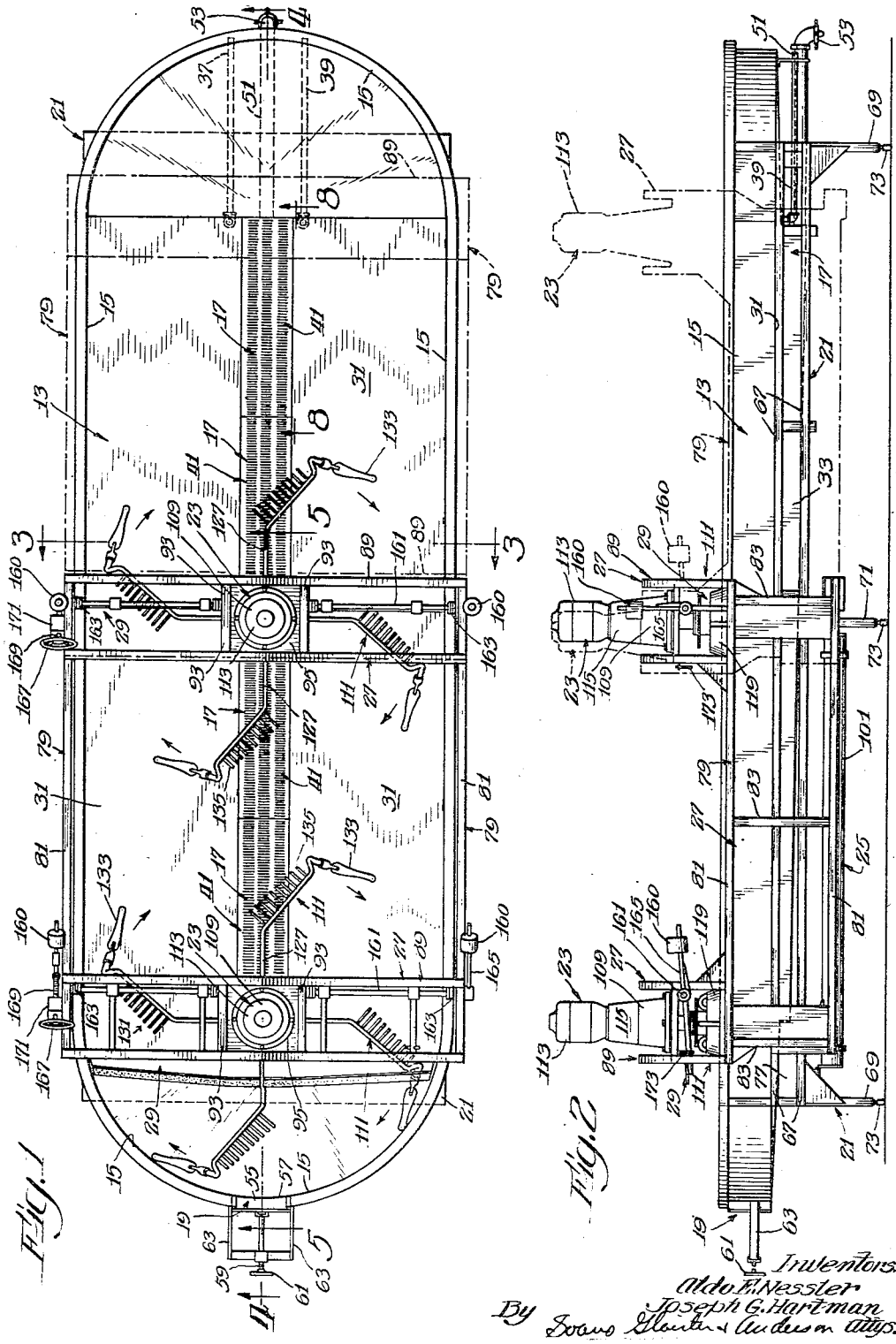
Inventors
Aldo E. Nessler
Joseph G. Hartman
By Downs Gloutier & Anderson attys.

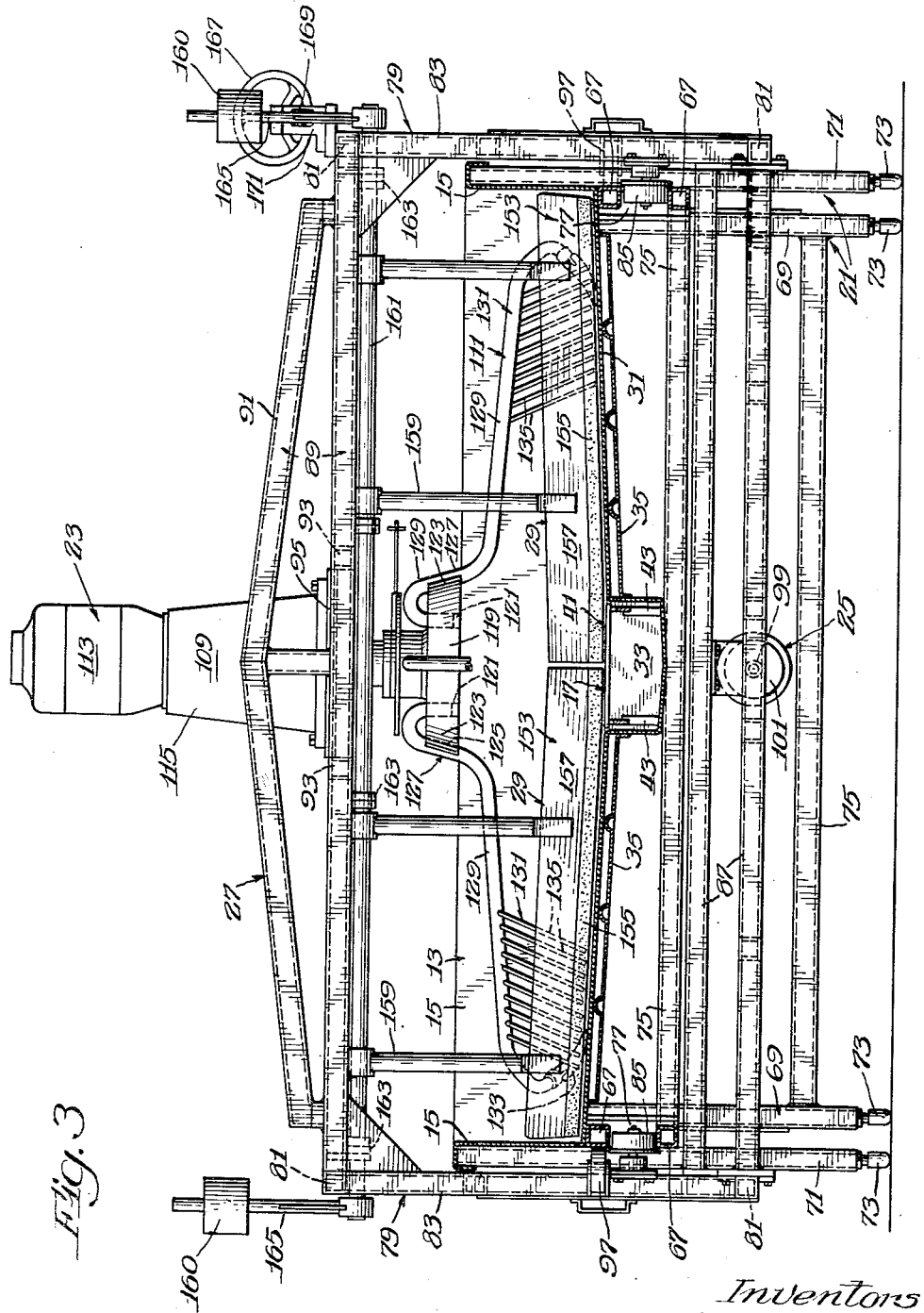

Dec. 18, 1956   A. E. NESSLER ET AL   2,774,140
TRAVELING ROTARY VAT STRAINER
Filed Oct. 12, 1954   5 Sheets-Sheet 3
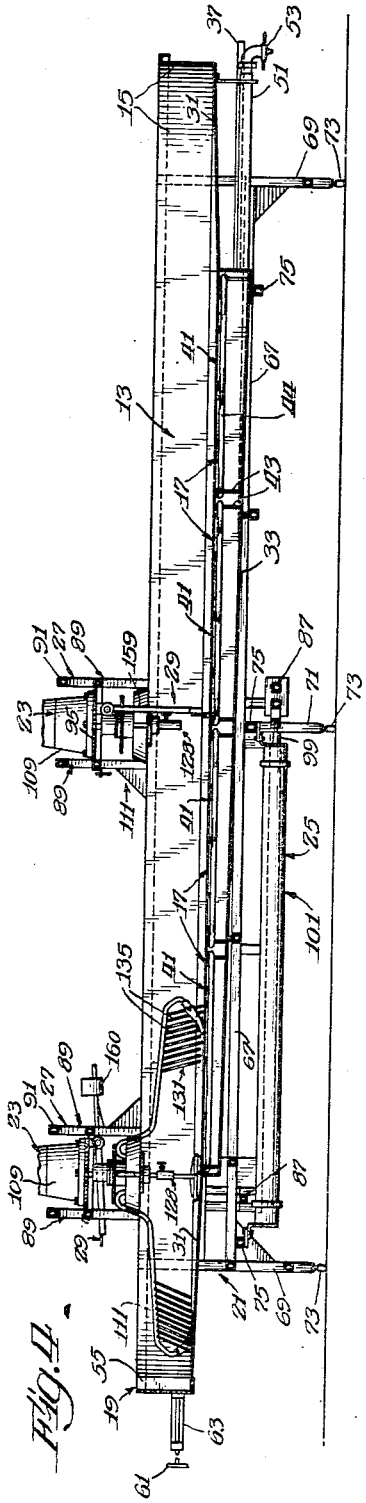
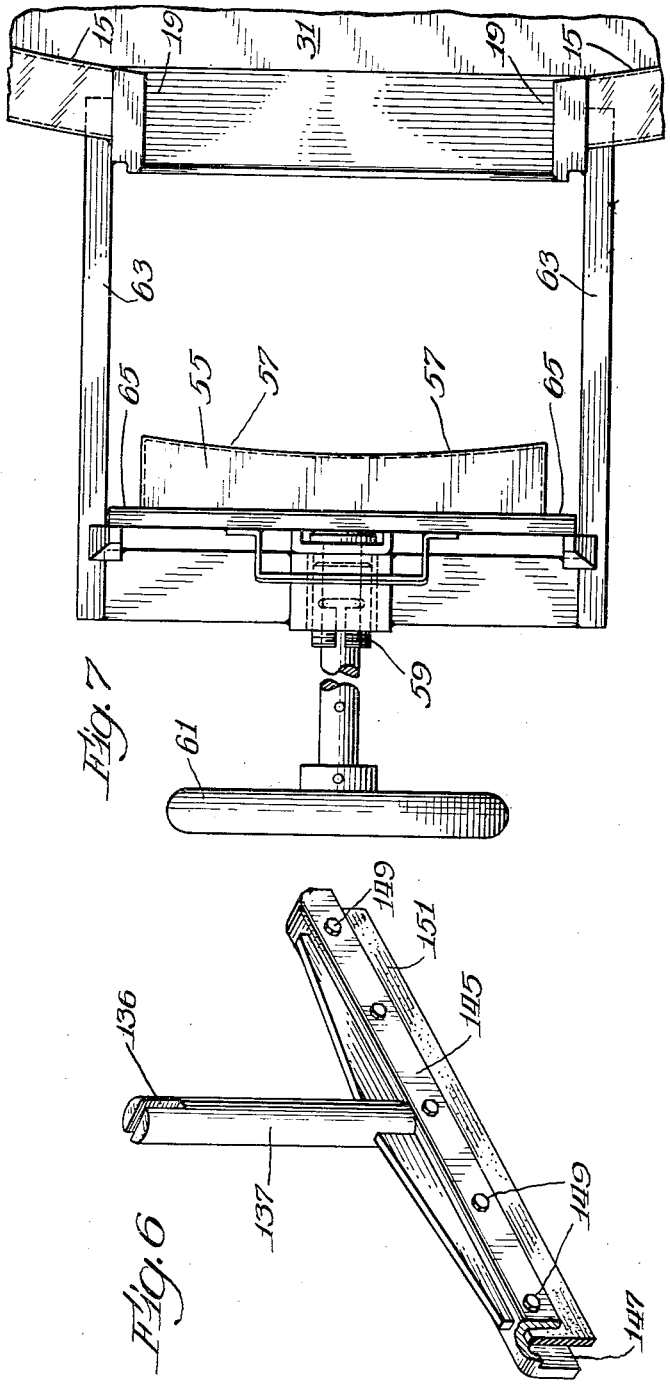
Inventors:
Aldo F. Nessler
Joseph G. Hartman
By Soans Glarston and Andre Attys.

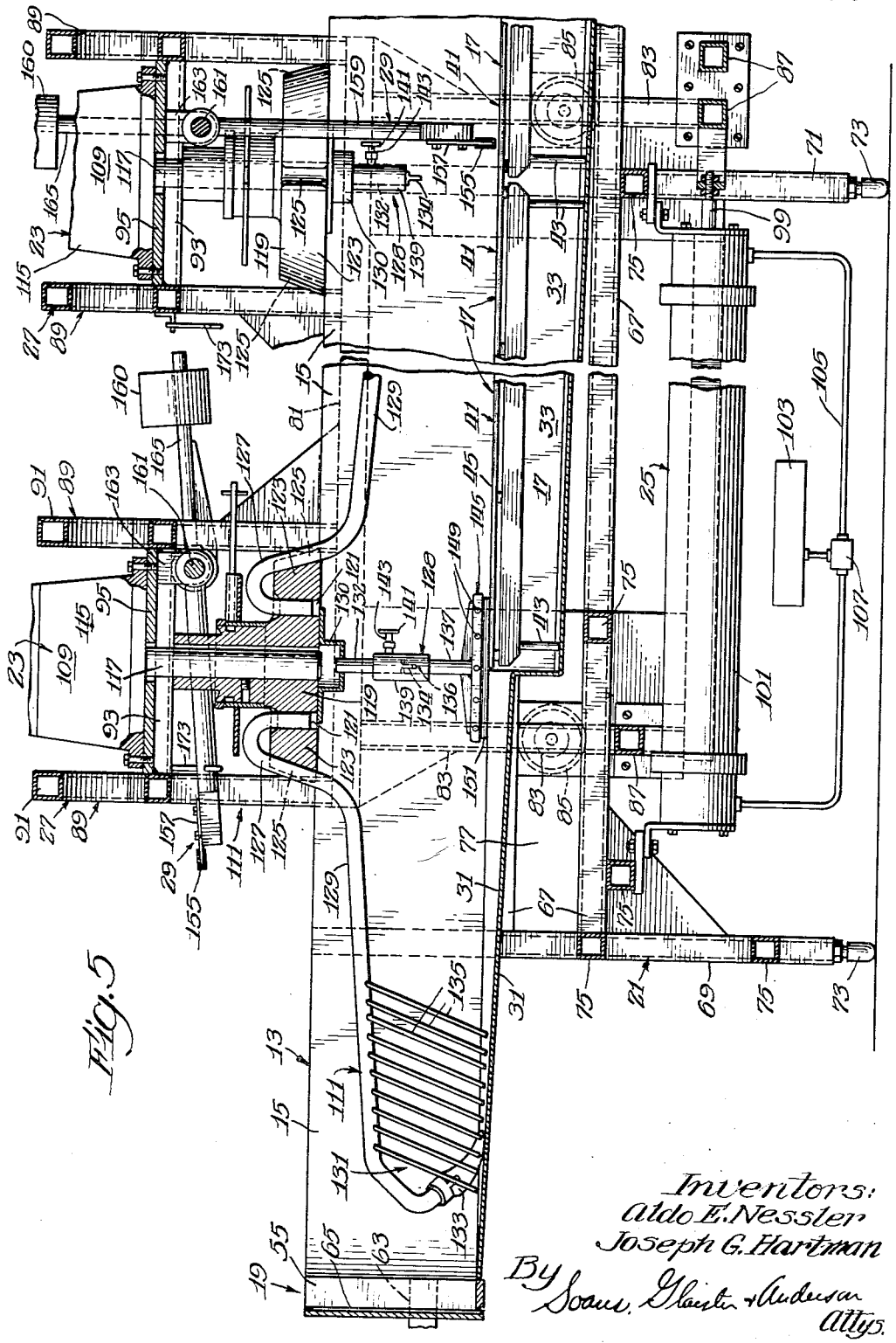

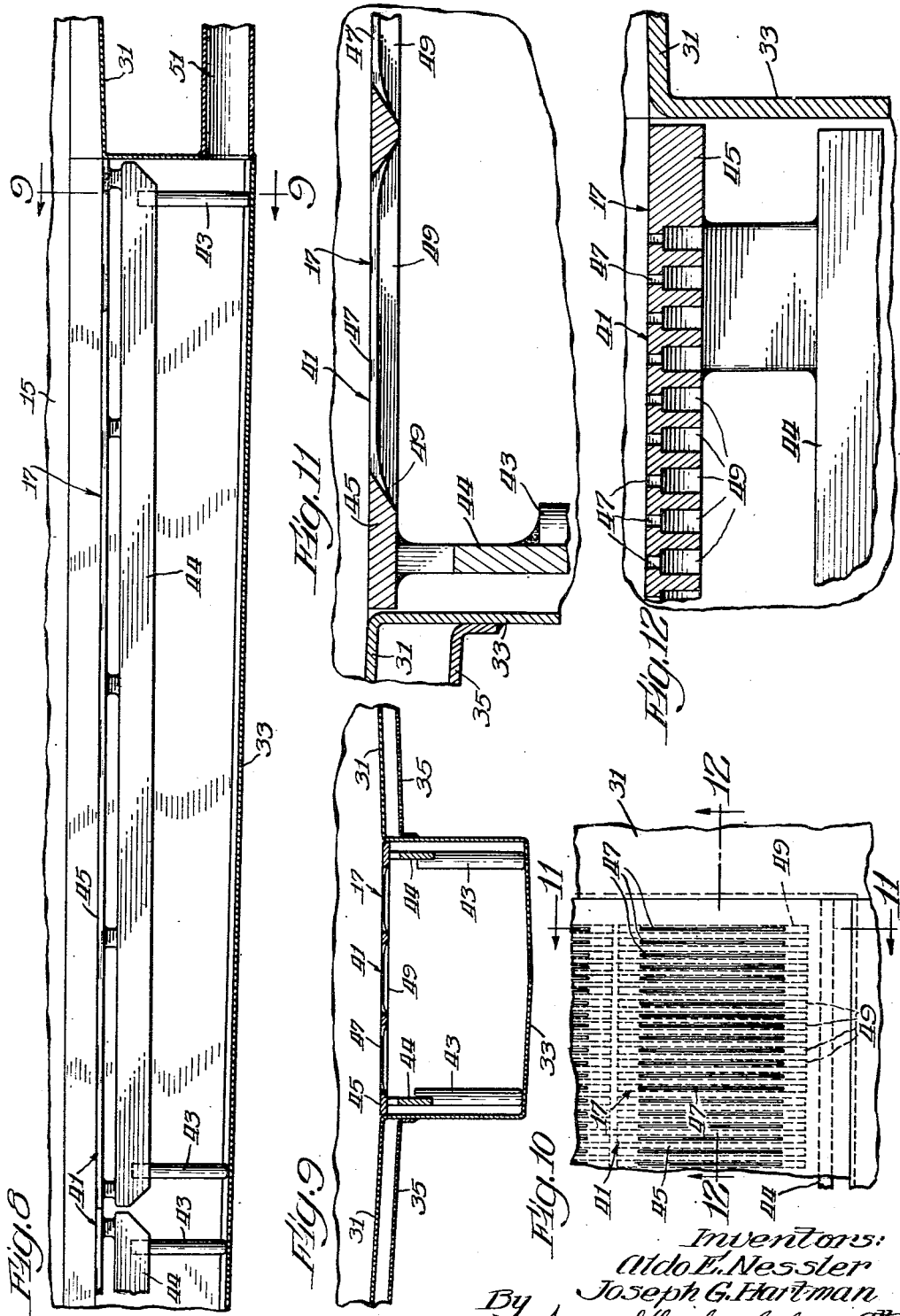

United States Patent Office 2,774,140
Patented Dec. 18, 1956

2,774,140

TRAVELING ROTARY VAT STRAINER

Aldo E. Nessier, Evanston, and Joseph G. Hartman, Wilmette, Ill., assignors to Kraft Foods Company, Chicago, Ill., a corporation of Delaware Application October 12, 1954, Serial No. 461,724

13 Claims. (Cl. 31—48)

The present invention relates generally to an apparatus which is useful in the manufacture of cheese and, more particularly, relates to apparatus which is adapted for use in draining free whey from curd in a cheesemaking process wherein the curd is maintained in a substantially granular condition. Typical of the processes in which apparatus of this type is useful are the stirred curd cheddar process, the washed curd process, and other similar processes in which the whey is drained from the curd while the curd is maintained in the form of granules or discrete particles by mechanical agitation.

The manufacture of cheese by the traditional stirred curd cheddar procedure and like processes is rather inefficient and involves a great deal of manual labor. In the conventional stirred curd procedure the curd is made in a cheesemaking vat and cooked or heated to provide the desired acidity and firmness in the curd. This making procedure involves filling the vat with milk which is at the proper ripening temperature, adding a starter or culture of bacteria to the milk to develop the proper acidity, setting the milk with rennet to form a curd, cutting the curd into small cubes, e. g., from approximately a quarter to a half inch on an edge, and cooking the curd in whey at temperatures of from about 100 to 106° F. to secure the desired firmness and other characteristics. During the cooking in whey the curd is continuously agitated by means of travelling mechanical agitators so that the heating of the batch is uniform.

After the cheesemaker has determined that the curd is properly cooked, the whey is drained from around the curd in the making vat while the curd is being continuously stirred by the same mechanical agitating equipment which is used to stir the batch during the making process. These agitators travel up and down a vat and agitate the curd periodically a sufficient amount to keep it from matting. The condition of the curd at the stage when the whey is drained off is such that it tends to hold whey and resist drainage so that the mass of curd even with agitation does not drain rapidly. In order to facilitate drainage, the curd in the vat is "ditched," i. e., trenches or ditches are dug along the sides or down the center of the vat to facilitate whey drainage. In addition, certain portions of the curd in the corners of the vat and along the center of the vat are forked by hand to promote drainage of the free whey.

After the curd has been properly drained, usually after a stirring period of approximately 20 to 40 minutes, and after the acidity of the curd is at the proper point, salt is added to the curd in the conventional process and the mechanical stirrers associated with the vat are employed to thoroughly intermix the salt with the curd. The addition of the salt causes more whey to drain from the curd and the stirring in continued for a short period to insure the drainage of this additional whey.

At this time, the curd is in the proper condition to be placed in hoops and the curd in a granular condition is transferred by means of pails and shovels into the hoops in which it is to be formed. After the curd is in the hoops it is pressed overnight and then cured to produce either standard paraffined cheese or a rindless cheese.

As may be seen, the conventional manner and apparatus used in making stirred curd cheese are extremely inefficient since the drainage is poor (the whey from the upper end of the vat must run the whole length of the vat to reach the outlet of the vat, often a distance of 20 feet or more), there is a large amount of hand labor in forking the curd and in making the draining ditches, as well as the difficulties involved in removing the curd from the vat. Moreover, the making vat is employed in stirring the curd over a prolonged period of time, which period can often be used to better advantage in preparing a second batch of curd from milk.

Attempts have been to mechanize the stirred curd operation and to this end drain tables have been provided for separating the free whey from the curd. A drain table comprises a shallow container or vat which has a perforated area in the bottom thereof through which the whey may drain. The drain table is provided with a standard cheese-vat-type agitator to agitate the curd so as to minimize matting or knitting. In use, the curd and whey from the making vat is pumped into the drain table and the process is carried out in the drain table in much the same manner that it is carried out in the making vat. However, the drain table eliminates the need for digging ditches in the curd and also frees the cheese vat for use in making further batches of curd.

The drain tables which have been provided have not been entirely satisfactory in that a great deal of manual labor is still required and the drainage on the table is often slow and inefficient. For example, it is still necessary to unload the curd manually and to scrape it into piles that can be shovelled into the hoops or transferred to some other piece of apparatus for pressing or further drying. Also, the perforated areas of the known drain tables tend to become clogged with curd and the drainage must be carefully watched and clogged openings cleared when necessary. Further, the design of the known perforated draining sections for drain tables have resulted in abrasion of the curd as it has been carried across the perforated section with a resultant production of cheese dust and loss of curd in the whey.

The known drain table constructions are completely inadequate when a large batch of curd as, for example, a batch of curd made from about 20,000 to 25,000 pounds of milk, is to be treated. The agitator design of the type used in making cheese in a cheese vat is not adequate to handle the large batch. Further, with the large batch it is essential to discharge the curd rapidly from the drain table before it has a chance to mat or knit together and this is impossible with tables of the known designs because the unloading is carried out by manual means.

Accordingly, it is the principal object of this invention to provide a drain table structure which overcomes the deficiencies of the prior art devices. A more specific object of this invention is the provision of an efficient draining apparatus which may be adapted to the handling of large batches of cheese. Other objects of our invention are the provision of a drain table of the class described which includes mechanical unloading means for the curd, which includes improved draining means, and which includes an agitator mechanism of improved design.

Other objects of the invention will become known from reference to the following description and the appended drawings.

In the drawings:

Figure 1 is a plan view of a drain table embodying various features of the invention;

Figure 2 is a side elevational view of the drain table illustrated in Fig. 1;

Figure 3 is a sectional view taken along line 3—3 in Fig. 1;

Figure 4 is a sectional view taken along line 4—4 in Fig. 1;

Figure 5 is an enlarged fragmentary view taken along line 5—5 in Fig. 1;

Figure 6 is a perspective view partially in section of the drain scraper which constitutes a part of the apparatus shown in Figs. 4 and 5;

Figure 7 is an enlarged elevational view of the curd outlet or discharge opening and the closure therefor which constitutes a part of the apparatus illustrated in the preceding drawings;

Figure 8 is a sectional view taken along line 8—8 in Fig. 1;

Figure 9 is a sectional view taken along line 9—9 in Fig. 8;

Figure 10 is an enlarged view showing the details of the draining means employed in the apparatus illustrated in the preceding figures;

Figure 11 is a sectional view taken along line 11—11 in Fig. 10; and

Figure 12 is a sectional view taken along line 12—12 in Fig. 10.

In general, the embodiment of the apparatus illustrated in the drawings includes a table or tray 13 which is provided with side walls 15 to define a container or shallow vat which can receive the curd and whey from a cheesemaking vat (not shown). The bottom of the table 13 is provided with draining means 17 through which the free whey may be drained from the curd and one end of the table 13 is provided with a relatively large discharge opening or curd outlet 19 through which the drained curd may be discharged. The table 13 is supported in a horizontally disposed position upon a suitable frame 21 of fabricated construction. Agitating means 23 are provided for stirring and agitating the curd on the table 13 and power operated means 25 are provided for moving the agitating means 23 back and forth along the table 13 to insure that the curd in all areas of the table is thoroughly agitated. In the illustrated embodiment of the apparatus, the power operated means 25 for moving the agitating means 23 back and forth along the table is separate from the means which is provided to rotate the agitators.

As shown in the drawings, the agitating means 23 is supported for reciprocating movement on a carriage or bridge structure 27 which is supported upon the main frame 21 which supports the drain table. The carriage 27 is constructed to extend around the table 13 to insure rigidity in the structure. The carriage 27 also is provided with a scraper means 29 which may be moved into proximity with the bottom 31 of the table 13 and reciprocated therealong to effect automatic mechanical discharge of the curd which is being treated on the table 13. With this arrangement the power means for reciprocating the carriage 27 may be employed for discharging the curd mechanically.

Now more specifically describing the illustrated embodiment of the invention, the table or tray 13 for receiving the curd is elongated and includes a bottom 31 which slopes gradually downwardly to a central trough 33 (Figs. 3 and 4) which constitutes a part of the draining means 17. The sides 15 of the table 13 extend vertically and are high enough to insure that the batch being treated will be contained in the unit. The ends of the table 13 are semi-circular in outline so that the agitator means 23 will sweep the entire area of the table without leaving any corners or areas which are not subjected to agitation.

These semi-circular end portions also slope gradually downwardly to the trough 33 (Fig. 5). The bottom of the table 13 in the illustrated embodiment, over a major portion of its area, is provided with a heat exchange jacket 35 (Fig. 3) through which hot water or cool water may be circulated to adjust the temperature of the curd as desired. The inlet and outlet pipes for the jacket 35 are illustrated in the drawings as 37 and 39 (Figs. 1 and 4).

As shown in the drawings (Figs. 3 through 5 and 8 through 12), in the draining means 17 in addition to the trough 33 includes in the illustrated embodiment, a plurality of slotted screen members 41 which are arranged to prevent the passage of curd into the trough 33. Each of the screen members 41 includes a series of support legs 43 on which are carried a pair of longitudinally extending bars 44 which support a plate 45 which is provided with a series of slots or apertures 47. The plate 45 is proportioned so as to substantially fill the entire cross sectional area of the trough 33 (Fig. 9) and the support legs 43 are so proportioned that the upper surface of the plate 45 lies at the surface of the bottom 31 of the table 13 (Fig. 9) so to eliminate projections which would result in the breaking up of curd as it is agitated and moved across the bottom 31 and plate 45.

The apertures 47 in the plate 45 are in the form of slits which are so fabricated that they are wider at the bottom of the plate than at the top as shown at 49 (Figs. 9 to 11). This insures that any curd particles which might become lodged in the apertures will fall through without clogging the plate 45. This construction makes it extremely easy to clean the plates and it minimizes clogging. Further, the arrangement of the apertures 47 transversally of the longitudinal axis of the drain table minimizes abrasion of the curd as it is carried across the slots or apertures 47. The free whey which drains through the apertures into the trough 33 flows to one end of the trough 33 and is drained through an outlet pipe 51 which is provided with a suitable outlet valve 53.

It has been pointed out that one end of the table 13 is provided with the outlet 19 through which the curd may be mechanically discharged. As illustrated in Figs. 1 and 2 and particularly Fig. 7, the outlet 19 extends the entire height of the side wall 15 and is provided with a closure member 55 which is machined or otherwise formed as shown at 57, to conform to the curve at the end of the vat (Fig. 7). This closure member 55 is supported for movement into and out of the outlet 19 by a bayonet type locking screw 59 which is actuated by a hand wheel 61, the screw 59 and the hand wheel 61 being mounted on a support frame 63 which is attached to the end wall 15. To minimize the flow of whey around the closure member 55 a suitable gasket 65 is provided to seal any openings.

The table 13 is supported upon the frame 21 as before pointed out in a horizontally disposed position. The frame 21 includes a pair of vertically spaced apart, longitudinally extending members 67 on each side of the table 13. The upper of each of said pair engaging the bottom 31 of the table 13 (Fig. 3). At each end of the table 13 there are provided a pair of support legs 69 which are welded or otherwise attached to the inner side of the members 67 and on each side of the unit thereof midway between the pairs of legs 69 there is provided, in the illustrated structure a single support leg 71 which is connected to the outside of the members 67. As illustrated, each of the legs 69 and 71 are provided with leveling screws 73 to facilitate the leveling of the table 13.

In addition to the support provided for the table 13 by the engagement between the bottom 31 of the table and the members 67, there is provided a number of cross members 75 which interconnect the members 67 which reinforce the structure and which aid in supporting the bottom 31 of the table. It will be noted from the drawings (Figs. 3 and 5) that the longitudinal members 67 provide a track or guideway 77 which extends the length of the drain table structure.

As before outlined, the carriage 27 carries the agitating means 23 and is adapted to be reciprocated from one end of the table 13 to the other when the curd is being agitated or discharged. The carriage 27 includes a pair of rectangular side members 79 (Fig. 1) each of which are fabricated from an upper and a lower longitudinal member 81 which are inter-connected by a series of vertically-extending members 83. One of the rectangular side members is disposed on each side of the frame 21. Each side member carries journalled thereon a pair of longitudinally spaced apart rollers 85 which are adapted to ride in the guideway 77 provided by the structural members 67. The side members 79 are inter-connected under the table 13 by a series of cross braces 87 as illustrated in Figs. 3 and 5.

The rectangular side members 79 are inter-connected at their upper ends by a pair of spaced apart truss units 89 which provide rigidity to the carriage structure and which provide a support for the agitating means 23. Each truss unit 89 includes a pair of spaced apart triangular sections 91 which are connected at their sides to the side members 79 and which are inter-connected adjacent the central portion of the table 13 by the member 93. The member 93 and the triangular unit 91 provide a rigid platform 95 for supporting the motor and drive unit.

As will be seen the carriage 27 as fabricated provides a box-like structure which extends around the table 13 and which is movable lengthwise along the table 13 on the rollers 85. Side thrust is absorbed by a pair of thrust rollers 97 which are arranged at diagonally opposite corners of the carriage 27 and which bear against longitudinally extending members 67 of the main frame 21.

Movement of the carriage 27 is accomplished by means of the power operated means 25. In the illustrated embodiment, the power operated means 25 comprises an air actuated piston (not shown) which operates in a cylinder 101 as illustrated and effects movement of the piston rod 99. A suitable source of air, schematically illustrated by 103 in Fig. 5 is connected to the cylinder 101 by suitable conduits 105, and a series of timing and limit switches and which is schematically illustrated at 107 in Fig. 5 is operable to control the supply of air so as to automatically move the carriage 27 backwards and forwards along the length of the drain table.

Movement of the carriage or bridge in the illustrated embodiment is so arranged that the positions of the center lines of the two truss units 89 do not overlap so that the central supporting leg 71 may be provided to reinforce the main frame 27 (see Fig. 2).

The agitating means 23 consists of a pair of agitators, one of which is mounted on each of the truss units 89 and positioned so as to be located along the center line of the drain table 13 directly above the draining means 17. Each of the agitators includes a power means 109 and an agitator element 111. The power means 109 in the illustrated embodiment includes an electric motor 113 which is provided with a speed reducer 115. The motor 113 and the speed reducer 115 are supported on a pair of cross pieces 93 which are connected on each end to one of the truss units 89. Extending downwardly from each of the speed reducers 115 is a drive shaft 117. An agitator hub 119 is attached to the lower end of the drive shaft 117 as shown in Fig. 5. The agitator hub 119 is a generally circular block which is provided on its upper surface with four holes 121 which are spaced at equal intervals around the hub 119. Around the periphery of the hub there are provided four bosses or lugs 123 which are arranged in radial alignment with the holes 121. Each of the bosses 123 is provided with a generally vertically extending groove or slot 125, the slots and the holes 121 cooperating to form seats for a series of agitator arms 127 which constitute a part of the agitator element.

Each of the agitator arms 127 includes a supporting member or shaft 129 and an agitating element 131. As illustrated in Figs. 1 and 3, each of the supporting members 129 is attached at its inner ends to the hub 119 and extends outwardly to provide a support for a plow 133 which is so positioned that it will sweep the bottom 31 outwardly to a point adjacent the side walls 15. It will be seen that the member 129 slopes downwardly from its point of attachment to the hub 119 to its point of attachment to the plow 133 and, as illustrated, the member 129 initially extends radially outwardly from the hub for about half of its length and then extends forwardly in direction of motion of the plow 133 (indicated by the arrows in Fig. 1) at an angle of about 30°. The outer or forwardly extending section includes a series of short tines or rods 135 which are adapted to be drawn through the curd so as to break it into discrete particles. The outer end of the member 129 carries the plow 133 which is a generally horizontally disposed blade arranged with its long axis in the direction of movement of the plow 133. At its rearward end, the plow is attached by means of a horizontally disposed pivot to the outer end of the member 129.

Each of the members 129 is connected to the hub 119 by means of an inverted U-shaped section, one of the legs of which U fits in the hole 121 and the other leg of which fits in the slot or groove 125. This construction makes the agitator elements readily dismountable.

The agitating means 23 also includes in the illustrated embodiment, a drain scraper assembly 128. This drain scraper assembly, as illustrated in Fig. 5, consists of a mounting member 130 which is attached to the bottom of the agitator hub 119. Extending downward from the mounting member 130 is a shaft 132 which is located along the axis of the agitator shaft 117. The end portion of the shaft 132 is fashioned into a tongue 134 which fits into a groove 136 in a lower shaft 137 to provide a driving connection while permitting limited up-and-down movement of the lower shaft 137. The shaft 132 and the lower shaft 137 are prevented from jack knifing by a sleeve 139 which fits around the tongue 134 and the groove 136. The sleeve 139 is held in place by a locking device 141 which may consist of a plunger 143 which is designed to fit in a hole (not shown) in the shaft 132.

At the lower end of the lower shaft 137 there is provided a cross piece or scraper blade holder 145. The blade holder 145 is grooved as shown at 147 to receive a scraper blade of synthetic rubber or other material which will not impart an off flavor in the cheese. A series of bolts 149 connects the scraper blade 151 in the groove 147. When the agitator hub revolves, the lower shaft 137 turns and rotates the scraper blade 151 over the slotted plate 45 keeping the slots 47 free of curd particles. Since it is not necessary except under extremely adverse draining conditions to clean the plate 45, the scraper blade is only used over limited periods in the draining of the curd and the sleeve and tongue and groove connection makes possible rapid mounting or dismounting of the scraper blade as needed.

As has been pointed out, in order to provide a means for removing the drained curd from the drain table 13 after the cutting and draining operation are complete the carriage 27 is provided with a pair of scraper means 29 as illustrated particularly in Figs. 3 and 5. One of the scraper means 29 is associated with and supported by each of the truss units 89. The two scraper means 29 are of identical construction so that only one will be described and corresponding parts will be given corresponding numbers.

The scraper means 29 includes a pair of scraper blades 153 which provide a scraper assembly which is as wide as the drain table 13 and is shaped to conform with the drain table bottom 31. The scraper blades 153 each include a rubber or other flexible scraper element 155 which is mounted on a reinforcing member 157. Each of the reinforcing members is connected to its associated truss unit 89 by means of a pair of rods 159. The rods 159 are rigidly connected to a cross shaft 161 which is journailed in a plurality of suitable bearings 163 attached to the truss unit 89. In order to counter-balance the weight of the scraper blades 153 there are provided a pair of counter-balanced weights, each of which is rigidly attached by means of an arm 165 to the shaft 161. Control of the position of each pair of blades is accomplished by a hand wheel 167 which actuates a positioning screw 169. The screw is supported in a block 171 attached to the truss unit 89 and bears against a plate on the arm 165. The action of the positioning screw is such that the height of the blades above the bottom 31 may be accurately controlled. The scraper blade is held in its non-operative or raised position by means of a hook 173 (Fig. 5).

In the operation of the drain table 13, curd and whey are pumped through the cheesemaking vat onto the drain table by a suitable pump. Water of the desired temperature may be circulated through the heat exchange jacket 35 to maintain the curd and whey at the proper temperature during the stirring and draining operation. The cylinder 101 and the air control unit 107 moves the carriage 27 back and forth the length of the drain table. The motor 113 turns the agitator assembly 111 to thoroughly agitate the curd so as to prevent knitting. The whey outlet 53 is maintained open and the whey drains through the trough 33 through the outlet 53 and thence to a disposal point.

Depending upon conditions, the drain scraper 128 may be attached to clean the surface of the plate 45, a drain scraper being attached to each of the agitator assemblies.

As the whey is drained, curd is continually stirred by the rotating agitator assembly and when it is fully drained agitator elements 127 on the forward agitator, i. e., the agitator adjacent the curd outlet 19, are removed from the hub 119. The forward scraper blade is then released from its hook and the end gate or curd outlet 19 is opened. The carriage 27 is then reciprocated and the position of the forward scraper blade 153 is adjusted so that it moves about a two or three inch layer of curd from the forward half of the drain table 13 to the outlet 19. This is continued until the forward half of the drain table is almost emptied of curd, during which time the rearward agitator is rotated to keep the curd from matting or knitting in the rearward end of the drain table.

At this time, the agitator elements on the rearward agitator 23 are removed and the rearward scrapper blade 153 is removed from its supporting hook and lowered into position to scrape the curd from the rearward half of the table to the center thereof. As illustrated in the drawings (Fig. 2), the rearward scraper blade is located more or less centrally of the rearward truss member 89 while the forward scraper blade is located on the rearward side of its associated truss unit 89. This causes the area scraped by the two blades to overlap somewhat so that the material brought forwardly by the rearward scraper blade 153 is picked up on the next reciprocation by the forward scraper blade which then carries it to the oulet 19.

Of course, a small amount of manual labor is required to shovel the curd in the rear semi-circular end of the vat to a point where it can be picked up by a scraper blade, and some manual work is necessary to assist the scraper blade 153 in discharging the curd through the outlet 19, however, as compared to the manual work which was required in the past, the amount of labor required is negligible.

In operation, it is desirable that the counter-weights 160 on the scraper blades 153 be so adjusted that a minimum of pressure is exerted on the curd as the scraper blade 153 moves rearward over the curd on its return cycle. This minimizes premature matting of the curd and permits the curd to be discharged in granular form.

As will be seen from the foregoing description, a structure embodying the various features of this invention makes possible the mechanical handling of the curd with a minimum of manual labor. Moreover, the unit of the invention even in large sizes is relatively portable because it is self contained and requires no overhead structure to support the agitators and, as a result of this type of construction, a drain table unit may be made in any size desired without regard to the plant structure in which it is housed.

In addition to the above, the co-action between the agitator blades and forks and the slotted drain plate which extends along the central portion of the drain table minimizes curd abrasion and breakage so that there is a minimum of cheese dust lost in the whey. Further, the drain scraper may be used to facilitate drainage of slow draining batches and to prevent clogging of the slotted plates under adverse draining conditions.

The combination of the separate power means for the carriage and for the agitators together with the combined agitator and scraper blade assembly results in a unit which employs the same power means to reciprocate the scrapers and to discharge the drained curd from the unit. This mechanical discharge means speeds up the operation so that the curd does not have time to mat or knit while it is being discharged and this, too, makes the handling of larger batches with resulting economies.

Various features of the invention are set forth in the appended claims.

We claim:

1. Apparatus adapted for use in draining free whey from cheese curd while said curd is in the form of discrete particles comprising means defining the bottom and side walls of a tray which is adapted to hold the curd from which the free whey is to be separated, a foraminous section in the bottom of said tray through which whey may be drained, a frame for supporting said tray in a generally horizontal position, said frame including means defining a guide below the upper edge of each side of said tray, a carriage which is supported on said guides for movement along said tray, means for reciprocating said carraige along said tray, and agitator means supported by said carriage to agitate curd in said tray.

2. Apparatus adapted for use in draining free whey from cheese curd while said curd is in the form of discerte particles comprising means defining the bottom and side walls of an elongated tray which is adapted to hold the curd from which the free whey is to be separated, a foraminous section in the bottom of said tray through which whey may be drained, a frame for supporting said tray in a generally horizontal position, said frame including a track outside of each side of said tray, said track being disposed longitudinally of said tray and below the upper edge of said side, a movable carriage means for supporting said carriage for movement on said tracks along said tray, means for reciprocating said carriage on said tracks, agitator means supported by said carriage to agitate curd in said tray and power means for operating said agitator which is separate from the means for reciprocating said carriage.

3. Apparatus adapted for use in draining free whey from cheese curd while said curd is in the form of discrete particles comprising means defining the bottom and side walls of an elongated tray which is adapted to hold the curd from which the free whey is to be separated, a foraminous section in the bottom of said tray through which whey may be drained, a frame for supporting said tray in a generally horizontal position, said frame including a pair of tracks disposed along and outside of each side of said tray, said tracks being generally horizontally disposed, vertically spaced apart and arranged longtitudinally of said tray to form a guideway, a carriage, means for supporting said carriage on said pairs of tracks including roller means which is disposed in said guideway, means for reciprocating said carriage on said tracks, and agitator means supported by said carriage to agitate curd in said tray, and said roller means in said guideway preventing substantial vertical movement of said carriage and its associated agitator means.

4. Apparatus adapted for use in draining free whey from cheese curd while said curd is in the form of discrete particles comprising means defining the bottom and side walls of an elongated tray which is adapted to hold the curd from which the free whey is to be separated, a foraminous section in the bottom of said tray through which whey may be drained, a frame for supporting said tray in a generally horizontal position, said frame including a pair of spaced apart, vertically aligned tracks along each side of said tray, said tracks defining a guideway and being parallel and generally horizontally disposed and extending longitudinally of said tray, a carriage adapted to bridge said tray including a pair of longitudinal sections, one of which is positioned on each of said guideways and a bridging section which interconnects said longitudinal sections, support rollers in each of said guideways connected to the longitudinal section associated therewith to support said carriage for longitudinal movement along said tray while preventing substantial relative vertical movement therebetween, and at least one roller positioned on said longitudinal members to bear against one of said tracks to prevent substantial sidewise movement of said carriage relative to said tray, means for reciprocating said carriage along said guideways, and agitator means in said bridging section adapted to agitate curd in said tray.

5. Apparatus adapted for use in draining free whey from cheese curd while said curd is in the form of discrete particles comprising means defining the bottom and side walls of a tray which is adapted to hold the curd from which the free whey is to be separated, a foraminous section in the bottom of said tray through which whey may be drained, a movable carriage, means for supporting said carriage to bridge said tray, means for reciprocating said carriage along said tray, agitator means supported on said carriage, a scraper blade which extends across said tray, means for hingedly connecting said scraper blade to said carriage whereby said scraper blade is adapted to swing into position to scrape the bottom of said tray so as to push the curd in one direction with the reciprocation of said carriage.

6. Apparatus adapted for use in draining free whey from cheese curd while said curd is in the form of discrete particles comprising means defining the bottom and side walls of an elongated tray which is adapted to hold the curd from which the free whey is to be separated, a curd outlet in said side wall at one end of said tray, a foraminous section in the bottom of said tray through which whey may be drained, means defining a guide disposed along each of the sides of said elongated tray, a movable carriage, means including said guides for supporting said carriage for reciprocating movement along said tray, means for reciprocating said carriage, a scraper blade extending across said tray, means for hingedly connecting said scraper blade to said carriage, said hinged means including means which limits swinging movement of said blade relative to said carriage when said carriage is moving towards said outlet and thereby causes curd to be engaged by said blade so as to move it to said outlet and which permits swinging movement of said blade relative to said carriage as said carriage moves away from said outlet and thereby permits said blade to ride over the curd on said tray.

7. Apparatus adapted for use in draining free whey from cheese curd while said curd is in the form of discrete particles comprising means defining the bottom and side walls of an elongated tray which is adapted to hold the curd from which the free whey is to be separated, a curd outlet in said side wall at one end of said tray, a foraminous section in the bottom of said tray through which whey may be drained, means defining a guide disposed adjacent each of the sides of said elongated tray, a movable carriage, means including said guides for supporting said carriage for reciprocating movement along said tray, means for reciprocating said carriage, a pair of scraper blades which extend across said tray, means for hingedly connecting each of said scraper blades to said carriage, each of said hinged means including means which limits swinging movement of said associated blade relative to said carriage when said carriage is moving towards said outlet and thereby causes curd to be engaged by said blade so as to move it to said outlet and which permits swinging movement of said blade relative to said carriage as said carriage moves away from said outlet and thereby permits said blade to ride over the curd on said tray, each of said scraper blades being positioned on said carriage so as to scrape an over-lapping center section of the bottom of said tray such overlapping arrangement causing the scraper blade most remote from said outlet to carry said curd to said over-lapping center section whereupon the other scraper blade carries said curd from said overlapping center section to said outlet.

8. Apparatus adapted for use in draining free whey from cheese curd while said curd is in the form of discrete particles comprising means defining the bottom and side walls of an elongated tray which is adapted to hold the curd from which the free whey is to be separated, a curd outlet in said side wall at one end of said tray, a foraminous section in the bottom of said tray through which whey may be drained, means defining a guide disposed along and outside of each of the sides of said elongated tray, a movable carriage, means including said guides for supporting said carriage for reciprocating movement along said tray, means for reciprocating said carriage, a scraper blade which is proportioned to extend across said tray, means for hingedly connecting said scraper blade to said carriage, said hinged means including means which limits swinging movement of said blade relative to said carriage when said carriage is moving towards said outlet and thereby causes curd to be engaged by said blade so as to move it to said outlet and which permits swinging movement of said blade realtive to said carriage as said carriage moves away from said outlet and thereby permits said blade to ride over the curd on said tray, said means for limiting swinging movement of said blade including a stop for said blade on said carriage the position of said stop being adjustable to vary the depth of curd moved by said blade.

9. Apparatus adapted for use in draining free whey from cheese curd while said curd is in the form of discrete particles comprising means defining the bottom and side walls of an elongated tray which is adapted to hold the curd from which the free whey is to be separated, a curd outlet in said side wall at one end of said tray, a formanious section in the bottom of said tray through which whey may be drained, means defining a guide disposed outside of and below the upper edges of each of the sides of said elongated tray, a movable carriage, means including said guides for supporting said carriage for reciprocating movement along said tray, means for reciprocating said carriage, a scraper blade which is proportioned to extend across said tray, means for hingedly connecting said scraper blade to said carriage, said hinged means including means which limits swinging movement of said blade relative to said carriage when said carriage is moving towards said outlet and thereby causes curd to be engaged by said blade so as to move it to said outlet and which permits swinging movement of said blade relative to said carriage as said carriage moves away from said outlet and thereby permits said blade to ride over the curd on said tray, said means for limiting swinging movement of said blade including a stop for said blade on said carriage the position of said stop being adjustable to vary the depth of curd moved by said blade, and counter balance means for said scraper blade to reduce the pressure exerted by said blade in the curd as said carriage moves away from said outlet.

10. Apparatus adapted for use in draining free whey from cheese curd while said curd is in the form of discrete particles comprising means defining the bottom and side walls of a tray which is adapted to hold the curd from which the free whey is to be separated, a foraminous section in the bottom of said tray through which whey may be drained, a movable carriage, means for supporting said carriage in bridging relation to said tray, means for reciprocating said carriage along said tray, and agitator means supported on said carriage to agitate curd in said tray, said agitator means including a first agitator which sweeps the entire bottom area of said tray and a second agitator element which is adapted to engage and sweep said foraminous section of said tray.

11. Apparatus adapted for use in draining free whey from cheese curd while said curd is in the form of discrete particles comprising means defining the bottom and side walls of an elongated tray, the ends of said tray being semi-circular in outline, an elongated foraminous section in the bottom of said tray disposed along the center-line thereof, the remainder of said bottom being imperforate, a reciprocating agitator means supported for reciprocating movement longitudinally along the center-line of said tray, said agitator including agitator arms which are rotatably supported and proportioned to sweep the entire bottom area of said tray and a scraping member which is supported for rotation and which is proportioned to engage said foraminous section.

12. Apparatus adapted for use in draining free whey from cheese curd while said curd is in the form of discrete particles comprising means defining the bottom and side walls of an elongated tray, the ends of said tray being semi-circular in outline, an elongated foraminous section in the bottom of said tray disposed along the center-line thereof, the remainder of said bottom being imperforate, a reciprocating agitator means supported for reciprocating movement longitudinally along the center-line of said tray, said agitator including agitator arms which are rotatably supported and proportioned to sweep the entire bottom area of said tray and a scraping member which is supported for rotation and which is proportioned to engage said foraminous section, said scraping member including a resilient elongated member which is in rubbing contact with said foraminous member.

13. Apparatus adapted for use in draining free whey from cheese curd while said curd is in the form of discrete particles comprising means defining the bottom and side walls of an elongated tray, the ends of said tray being semi-circular in outline, an elongated foraminous section in the bottom of said tray disposed along the center-line thereof, the remainder of said bottom being imperforate, and a reciprocating agitator means supported for reciprocating movement longitudinally along the center-line of said tray and proportioned to sweep the entire bottom area of said tray, said foraminous section comprising plates having elongated slots therein, said slots being arranged transversely of the longitudinal axis of said tray whereby the movement of said agitator arms in the region of said foraminous section is in a direction substantially parallel to said slots.

References Cited in the file of this patent
UNITED STATES PATENTS

| | | |
|---|---|---|
| 841,997 | Miller | Jan. 22, 1907 |
| 1,611,854 | Damrow | Dec. 21, 1926 |
| 1,904,796 | McCaddam | Apr. 18, 1933 |
| 2,086,353 | Damrow | July 6, 1937 |
| 2,488,053 | Damrow | Nov. 15, 1949 |
| 2,617,191 | Detjen | Nov. 11, 1952 |